United States Patent
Kuppan

(10) Patent No.: US 11,143,208 B2
(45) Date of Patent: Oct. 12, 2021

(54) ASPIRATORS FOR EVACUATION ASSEMBLIES

(71) Applicant: Goodrich Corporation, Charlotte, NC (US)

(72) Inventor: Skandan Berikai Kuppan, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 199 days.

(21) Appl. No.: 16/399,469

(22) Filed: Apr. 30, 2019

(65) Prior Publication Data

US 2020/0191169 A1 Jun. 18, 2020

(30) Foreign Application Priority Data

Dec. 17, 2018 (IN) .............................. 201811047703

(51) Int. Cl.
*B64D 25/14* (2006.01)
*F04F 5/46* (2006.01)

(52) U.S. Cl.
CPC .............. *F04F 5/466* (2013.01); *B64D 25/14* (2013.01); *F04F 5/463* (2013.01)

(58) Field of Classification Search
CPC .... F04F 5/466; F04F 5/463; F04F 5/14; F04F 5/16; F04F 5/18; F04F 5/54; B64D 25/14; B63C 2009/0076; B63C 9/00
USPC ..................... 417/179, 180; 137/565.22, 223
See application file for complete search history.

(56) References Cited

U.S. PATENT DOCUMENTS

| | | | |
|---|---|---|---|
| 1,936,246 A * | 11/1933 | Carter ..................... | F04F 5/46 417/198 |
| 2,772,829 A | 5/1955 | Crawford et al. | |
| 2,892,582 A * | 6/1959 | O'Rourke .............. | F04F 5/463 417/179 |
| 3,042,290 A | 7/1962 | Fraebel | |
| 3,056,540 A | 10/1962 | Marsh et al. | |
| 3,608,274 A * | 9/1971 | Stingelin ................. | F04F 5/463 95/149 |
| 4,368,009 A | 1/1983 | Heimovics, Jr. et al. | |
| 4,835,961 A * | 6/1989 | Presz, Jr. ................ | F02K 1/386 60/264 |
| 5,496,152 A * | 3/1996 | Heise .................... | F04C 15/062 239/600 |
| 7,018,257 B2 | 3/2006 | Courtney | |
| 2010/0266424 A1* | 10/2010 | Renz ....................... | F04F 5/466 417/191 |
| 2018/0186461 A1 | 7/2018 | Haynes et al. | |
| 2019/0345874 A1* | 11/2019 | Scothern ................. | F01D 9/06 |

* cited by examiner

*Primary Examiner* — Bryan M Lettman
*Assistant Examiner* — Dnyanesh G Kasture
(74) *Attorney, Agent, or Firm* — Cantor Colburn LLP

(57) ABSTRACT

An aspirator for an evacuation assembly includes a duct defining a flow axis with an upstream portion and a downstream portion, a vane spanning the upstream portion of the duct, and a nozzle. The nozzle has an outlet, is supported by the vane, and is positioned within the upstream portion of the duct. The outlet is laterally offset from the flow axis and is axially overlapped by the vane to limit resistance to a primary gas flow entering the duct through the outlet of the nozzle. Evacuation assemblies are also described.

20 Claims, 6 Drawing Sheets

ASPIRATORS FOR EVACUATION ASSEMBLIES

CROSS REFERENCE TO RELATED APPLICATIONS

This application claims the benefit of Indian Application No. 201811047703, filed Dec. 17, 2018, the contents of which is incorporated herein by reference in its entirety.

BACKGROUND

The present disclosure relates to vehicle evacuation assemblies, and more particularly to aspirators for inflating evacuation devices such as on aircraft.

Vehicles, such as ships and aircraft, commonly carry evacuation assemblies for the safe disembarkation of passengers and crew. In the case of aircraft, for example, inflatable evacuation slides may be deployed to provide an exit for crew and passengers from aircraft if a jetway or other means of egress for passengers are not available. In the case of ships and some aircraft, rafts or pontoons may be deployed to provide a means of flotation for egressing passengers and crew or to provide flotation of the aircraft itself in the event of a water landing. Such inflatable evacuation assemblies are typically inflated using a compressed gas source, generally in cooperation with an aspirator, which limits the size of the compressed gas source required to inflate the evacuation assembly.

An aspirator is a type of ejector-jet pump which generally includes a nozzle located within a duct. When triggered in an inflatable evacuation assembly a flow of gas from the pressurized gas source is provided to the nozzle to accelerate fluid ingested from the ambient environment through the duct using the Venturi effect. The size of the compressed fluid source generally corresponds to the efficiency of the aspirator in combining the gas from the atmosphere and fluid from the compressed fluid source in inflating the evacuation device. The efficiency of the aspirator typically corresponds to the arrangement of the nozzles within the duct, turns in the conduit connecting the compressed supply typically reducing the efficiency of the aspirator and requiring larger volumes of compressed gas for a given inflation requirement.

Such conventional systems and methods have generally been considered suitable for their intended purpose. However, there remains a need for improved aspirators, evacuation assemblies, and methods of inflating evacuation assemblies. The present disclosure provides a solution to this need.

BRIEF SUMMARY

An aspirator for an evacuation assembly is provided. The aspirator includes a duct defining a flow axis with an upstream portion and a downstream portion. A vane spans the upstream portion of the duct. A nozzle with an outlet is supported by the vane and is positioned within the upstream portion of the duct, the outlet of the nozzle laterally offset from the flow axis and axially overlapped by the vane to limit resistance to a primary gas flow entering the duct through the outlet of the nozzle.

In addition to the one or more features described above, or as an alternative, further embodiments may include wherein the nozzle is a converging-diverging type nozzle.

In addition to the one or more features described above, or as an alternative, further embodiments may include wherein the nozzle is first nozzle and further comprising a second nozzle, the second nozzle arranged on a side of the flow axis opposite the first nozzle.

In addition to the one or more features described above, or as an alternative, further embodiments may include wherein the aspirator has no more than two nozzles.

In addition to the one or more features described above, or as an alternative, further embodiments may include a manifold coupling the nozzle to the vane.

In addition to the one or more features described above, or as an alternative, further embodiments may include wherein the manifold has a first tine portion and a second tine portion located on a side of the flow axis axially opposite the first tine portion.

In addition to the one or more features described above, or as an alternative, further embodiments may include wherein the manifold has a bident shape arcuate segments coupling the first and second tine portions to a stem portion, the stem portion connected to the vane.

In addition to the one or more features described above, or as an alternative, further embodiments may include wherein the first nozzle is connected to the first tine portion, wherein the second nozzle is connected to the second tine portion.

In addition to the one or more features described above, or as an alternative, further embodiments may include a union for connecting a compressed gas source to the nozzle, wherein the union is arranged upstream of the upstream portion of the duct, and wherein union is arranged along the flow axis defined by the duct.

In addition to the one or more features described above, or as an alternative, further embodiments may include a pressurized gas source connected to the nozzle.

In addition to the one or more features described above, or as an alternative, further embodiments may include wherein the upstream portion of the duct has a flow area with a rectangular shape, wherein the downstream portion of the duct has a flow area with a round shape, and wherein the duct further comprises a transition portion coupling the downstream portion to the upstream portion, the transition portion transitioning from a flow area with rectangular shape on an upstream end to a flow area with a round shape on the downstream end of the transition portion.

In addition to the one or more features described above, or as an alternative, further embodiments may include wherein the outlet is located upstream of the transition portion of the duct.

In addition to the one or more features described above, or as an alternative, further embodiments may include an inflatable body connected to the outlet portion of the duct and in fluid communication with the upstream portion of the duct.

In addition to the one or more features described above, or as an alternative, further embodiments may include at least one of an aircraft evacuation slide, a life raft, and a pontoon connected to the outlet portion of the duct and in fluid communication through outlet portion of the duct with the inlet portion of the duct.

In addition to the one or more features described above, or as an alternative, further embodiments may include wherein the vane divides an entrance into the upstream portion of the duct into a first secondary air inlet and a second secondary air inlet.

In addition to the one or more features described above, or as an alternative, further embodiments may include wherein the vane has a u-shaped profile with a base segment and opposed edge segments, the nozzle coupled to the base segment of the vane, the edge segments bounding a first secondary gas inlet and second secondary gas inlet into the upstream portion of the duct.

In addition to the one or more features described above, or as an alternative, further embodiments may include wherein the upstream portion of the duct has a height of about 4.8 inches (about 12.2 centimeters), wherein the upstream portion of the duct has a width of about 5.6 inches (about 14.2 centimeters), wherein the downstream portion of the duct has a diameter of about 4 inches (about 10.2 centimeters), and wherein the aspirator has an axial length of about 17 inches (about 43.2 centimeters).

An evacuator assembly is also provided. The evacuator assembly includes an aspirator as described above. A manifold couple the nozzle to the vane and has a first tine portion and a second tine portion, the manifold located on a side of the flow axis axially opposite the first tine portion. A compressed air source is connected to nozzle and an inflatable body selected from a group including an aircraft evacuation slide, a life raft, and a pontoon connected to the outlet portion of the duct and is in fluid communication through inlet portion with the inlet portion of the duct.

In addition to the one or more features described above, or as an alternative, further embodiments may include wherein the vane divides a secondary inlet located on the upstream portion of the duct into a first secondary air inlet and a second secondary air inlet, wherein the vane has a u-shaped profile with a base portion and opposed leg portions, the nozzle connected to the base portion of the vane, the leg portions bounding an inlet of the upstream portion of the duct.

In addition to the one or more features described above, or as an alternative, further embodiments may include wherein the nozzle is a converging-diverging nozzle, wherein the nozzle is first nozzle and further comprising a second nozzle, the second nozzle arranged on a side of the flow axis opposite the first nozzle, and wherein the aspirator has no more than two nozzles.

Technical effects of embodiments of the present disclosure include aspirators with relatively low resistance to primary gas flow traversing the aspirator, limiting the size of the compressed gas source required for evacuation assemblies for a given inflation requirement.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The patent or application file contains at least one photograph executed in color. Copies of this patent or patent application publication with color drawings(s) will be provided by the Office upon request and payment of the necessary fee.

The following descriptions should not be considered limiting in any way. With reference to the accompanying drawings, like elements are numbered alike:

Figure 1:
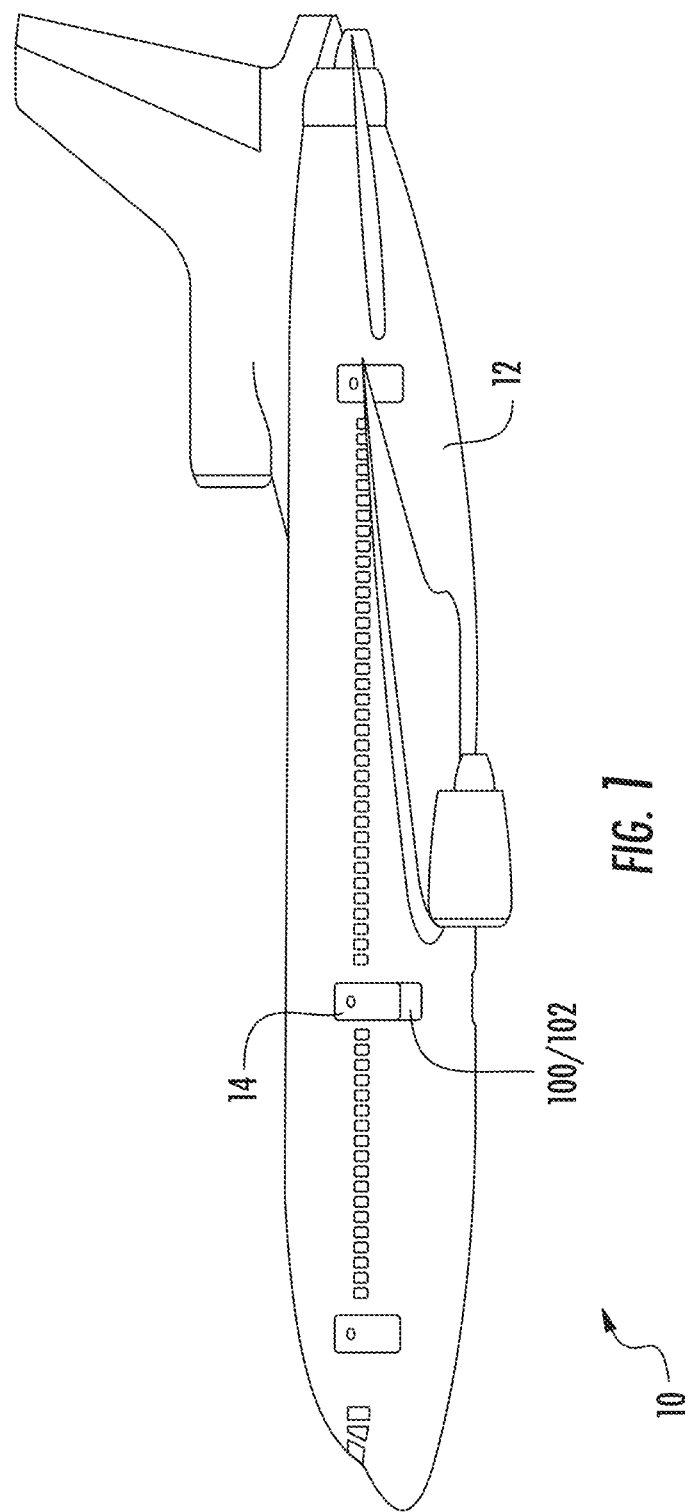
FIG. 1 is a side elevation view of an aircraft constructed in accordance with the present disclosure, showing the evacuation assembly including an aspirator and an inflatable body positioned at a door leading to the interior of the aircraft fuselage.
Figure 6:
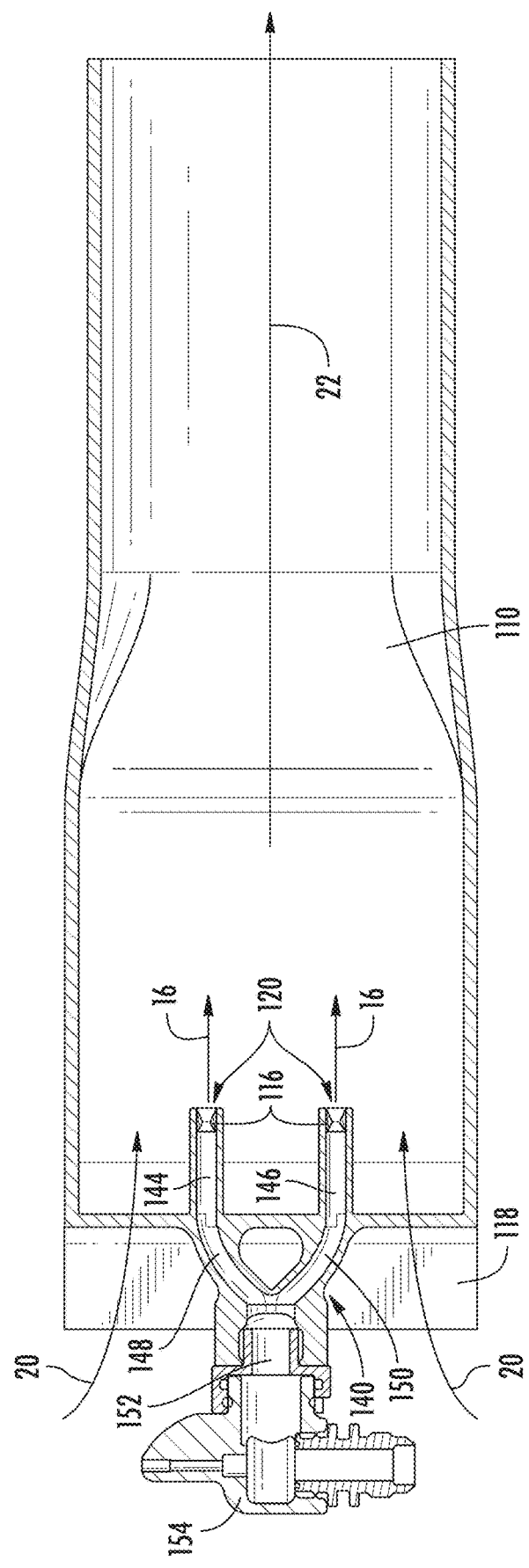
Figure 7:
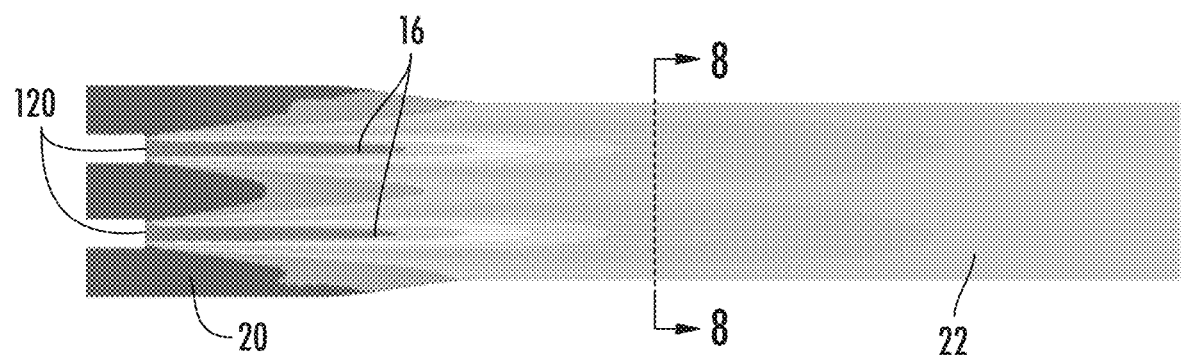
Figure 8:
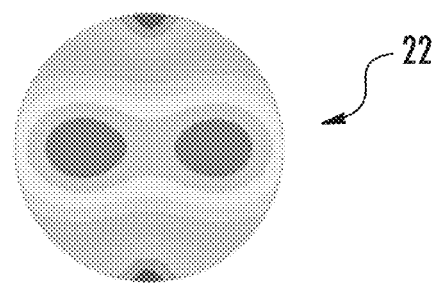
Figure 9:
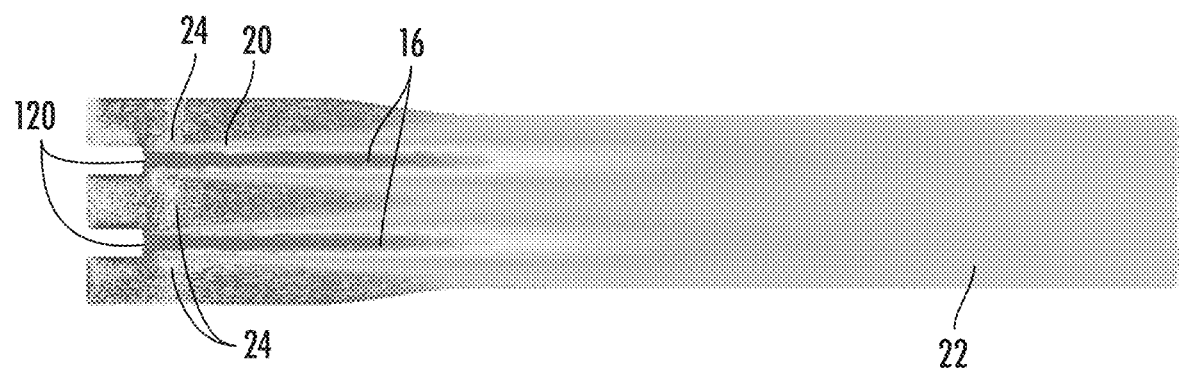

FIG. 6 is another cross-sectional side of the aspirator of FIG. 1, showing broadly swept arcuate portions of the manifold connecting a stem portion of the manifold to tine portions of the manifold to limit resistance pressure loss in the primary gas flow as it traverses the manifold; and FIGS. 7-9 flow velocity plots of the gas flow through the aspirator of FIG. 1, showing average flow velocity at the duct outlet and the relatively high mass flow rate provided by the aspirator.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of an aspirator in accordance with the disclosure is shown in FIG. 1 and is designated generally by reference character 100. Other embodiments of aspirators and evacuation assemblies employing aspirators in accordance with the present disclosure, or aspects thereof, are provided in FIGS. 2-9, as will be described. The aspirators and evacuation assemblies described herein can be used for inflating evacuation devices like slides, pontoons, and/or life rafts on vehicles, such as in marine and aerospace applications, though the present disclosure is not limited to a particular application or to any particular type of inflatable body in general.

Referring to FIG. 1, an aircraft 10 is shown. Aircraft 10 includes a fuselage 12 with a passenger and crew cabin located within the fuselage 12 and a door 14. An evacuation assembly 102 including the aspirator 100 aspirator is carried by the aircraft 10 and is positioned in proximity to the door 14, e.g., thereon, to provide egress of passengers and/or crew from the aircraft 10. For example, it is contemplated that the evacuation assembly 102 can be deployed and inflated in the event that a stair structure or a jetway is unavailable to facilitate egress of passengers and/or crew from the aircraft 10. Although shown in FIG. 1 and described herein in the context of an aircraft evacuation assembly, those of skill in the art will appreciate that other types of evacuation assemblies and inflatable bodies can also benefit from the present disclosure.

Figure 2:
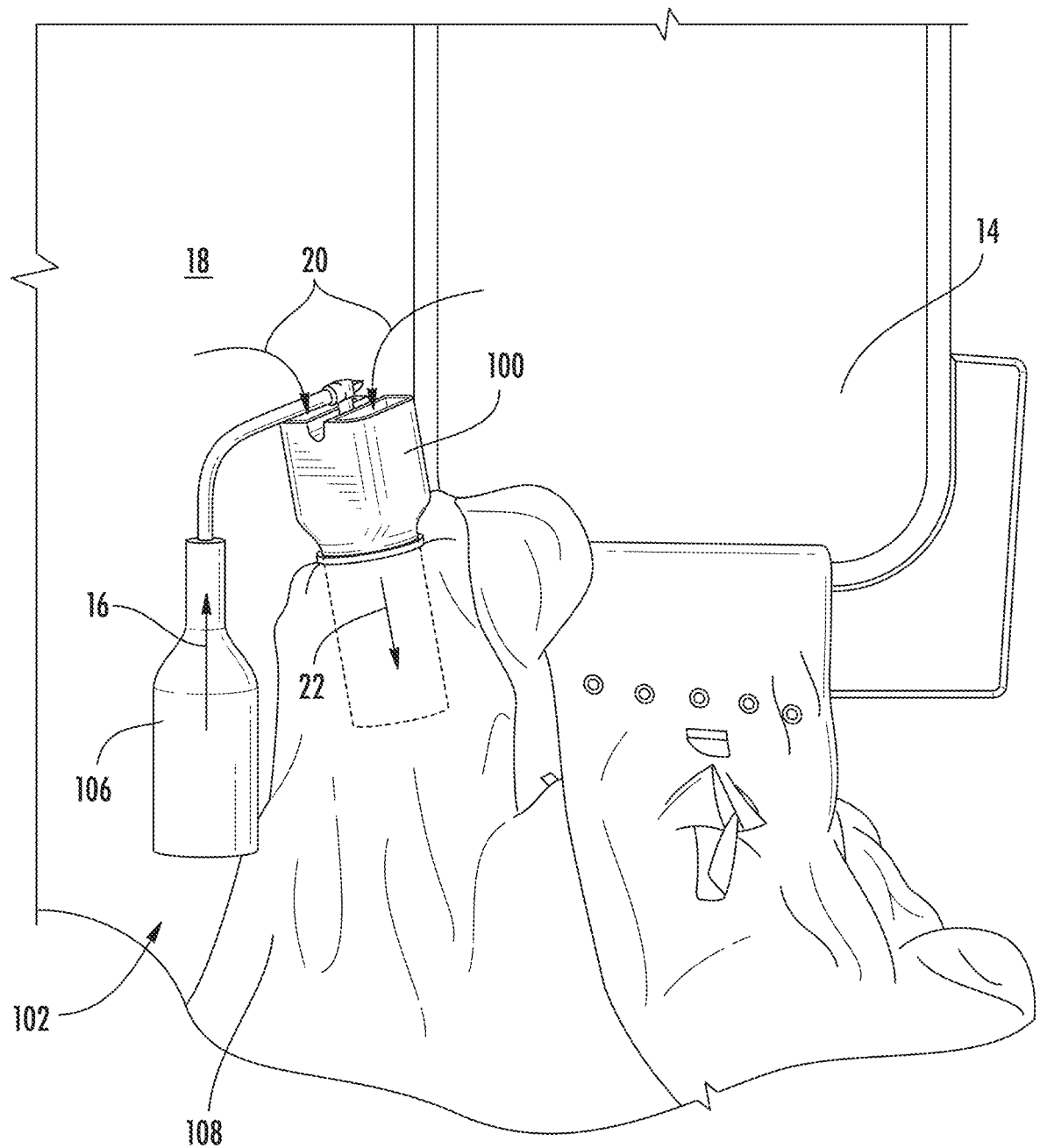
FIG. 2 is side elevation view of the evacuation assembly and the aspirator of FIG. 1, showing the aspirator connecting a compressed gas source to the inflatable body.

With reference to FIG. 2, the evacuation assembly 102 is shown. The evacuation assembly 102 is fixed to the door 14 (shown in FIG. 1) and includes the aspirator 100, a pressurized gas source 106, and an inflatable body 108. The pressurized gas source 106 can be an air bottle charged with compressed gas, e.g., nitrogen or air, and is connected to the aspirator 100 and is arranged to provide a primary gas flow 16 to the aspirator. The aspirator 100 is in fluid communication with the external environment 18, is connected to the inflatable body 108, is arranged to ingest and accelerate a secondary gas flow 20 ingested from the external environment 18, and is further arranged to provide an inflation gas flow 22 to the inflatable body 108 to inflate the inflatable body 108. In certain embodiments the inflatable body 108 includes an inflatable evacuation slide. In accordance with certain embodiments the inflatable body 108 includes a pontoon. It is also contemplated that, in accordance with certain embodiments, the inflatable body can include a life raft or other flotation device.

Typically, aspirators employ a shower-type nozzle assembly having a nozzle array with upwards of nineteen (19) nozzles arranged within a duct. The nozzles accelerate air moving through the duct to exploit the Venturi effect to generate an air flow suitable for inflating the structure connected to the aspirator. While generally acceptable for their intended purpose such nozzle assemblies generally reduce the pressure of the air used to generate the inflation air flow generated by the aspirator. In some nozzle assemblies, e.g., shower-type nozzle assemblies, the pressure drop associated with nozzle assembly can be upwards of 15% of more due to the number of bends required provide air to the various nozzles in the nozzle assembly. Further, placement of nozzles at (or in close proximity) to the flow axis of the duct can induce a relatively large number of recirculation zones within the duct, limiting the ability of aspirator to generate the inflation air flow. As a consequence such aspirators can require a larger compressed air source than otherwise necessary, adding weight and size to the assembly. To limit pressure drop in the primary gas flow 16 aspirator 100 employs an arrangement having a limited number of bends and nozzle assembly that develops a relatively small number of recirculation zones within the aspirator 100. As will be appreciated by those of skill in the art in view of the present disclosure, this limits the resistance flow area created within the aspirator 100, provides relatively limited resistance to flow through the aspirator 100, and allows the aspirator 100 to employ a relatively small compressed air source for a given inflation requirement.

With reference to FIGS. 3-6, the aspirator 100 is shown. The aspirator 100 includes a duct 110 defining a flow axis 112 and having an upstream portion 114 and a downstream portion 124. A vane 118 spans the upstream portion 114 of the duct 110. Nozzles 116 (shown in FIG. 5) with outlets 120 (shown in FIG. 5) are supported by the vane 118 and are positioned within the upstream portion 114 of the duct 110. Each outlet 120 is laterally offset from the flow axis 112 and is axially overlapped by the vane 118 to limit resistance to a primary gas flow 16 (shown in FIG. 2) entering the duct 110 through the outlet 120 of the nozzle 116.

Figure 3:
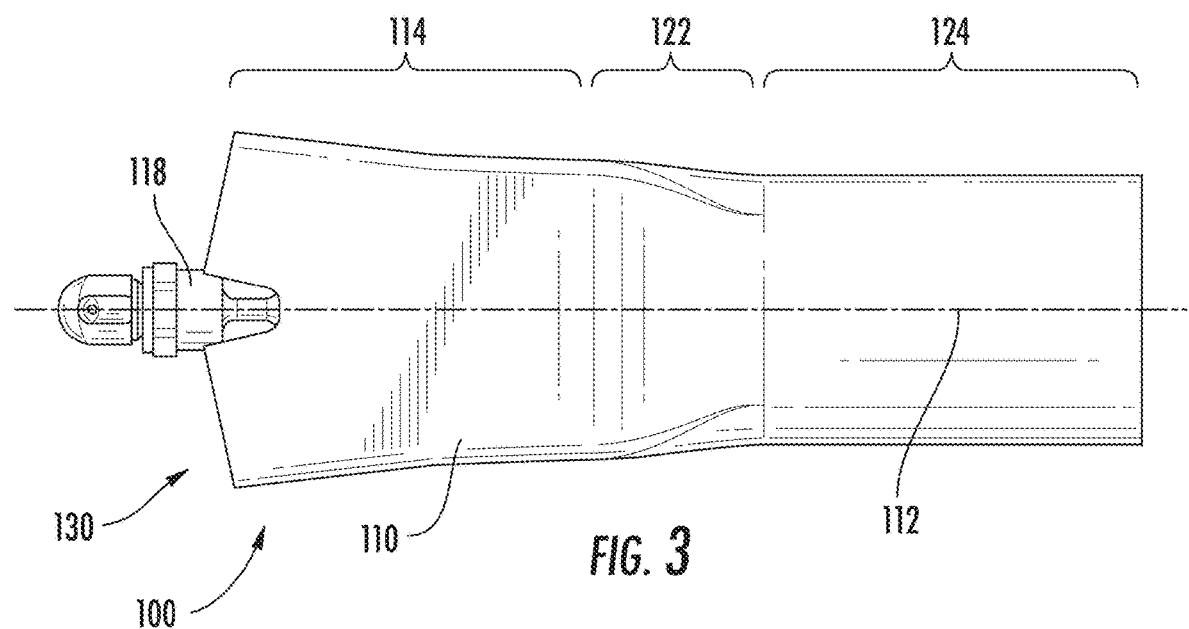
FIG. 3 is a plan view of the aspirator of FIG. 1, showing a duct with a vane seating a manifold for introducing a primary gas flow into the duct.

As shown in FIG. 3, the duct 110 includes a transition portion 122. Each of the upstream portion 114, the transition portion 122 and the downstream portion 124 are arranged along the flow axis 112. The transition portion 122 is arranged upstream of the downstream portion 124 and downstream of the upstream portion 114, and couples the downstream portion 124 to the upstream portion 114. The downstream portion 124 of the duct 110 is configured and adapted for fluid communication with the inflatable body 108 (shown in FIG. 2) and defines a flow area with a round shape 129 (shown in FIG. 4). The upstream portion 114 of the duct 110 has a flow area with a generally rectangular shape 127 (shown in FIG. 4).

The transition portion 122 transitions from flow area with a rectangular shape 131 (shown in FIG. 5) on an upstream end of the transition portion 122 to a flow area with a round shape 133 (shown in FIG. 5) on the downstream end of the transition portion 122. In certain embodiments the aspirator 100 can have an axial length that is about 17 inches (about 43.2 centimeters), the upstream portion 114 of the duct 110 has a height of about 4.8 inches (about 12.2 centimeters) and a width of about 5.6 inches (about 14.2 centimeters), and the downstream portion 124 of the duct 110 has a diameter of about four (4) inches (about 10.2 centimeters). This allows the aspirator 100 to fit within the envelope allocated to evacuation assemblies on civil aircraft for evacuation slides. In the illustrated embodiment wherein the outlets 120 are located upstream of the transition portion 122 of the duct 110.

Figure 4:
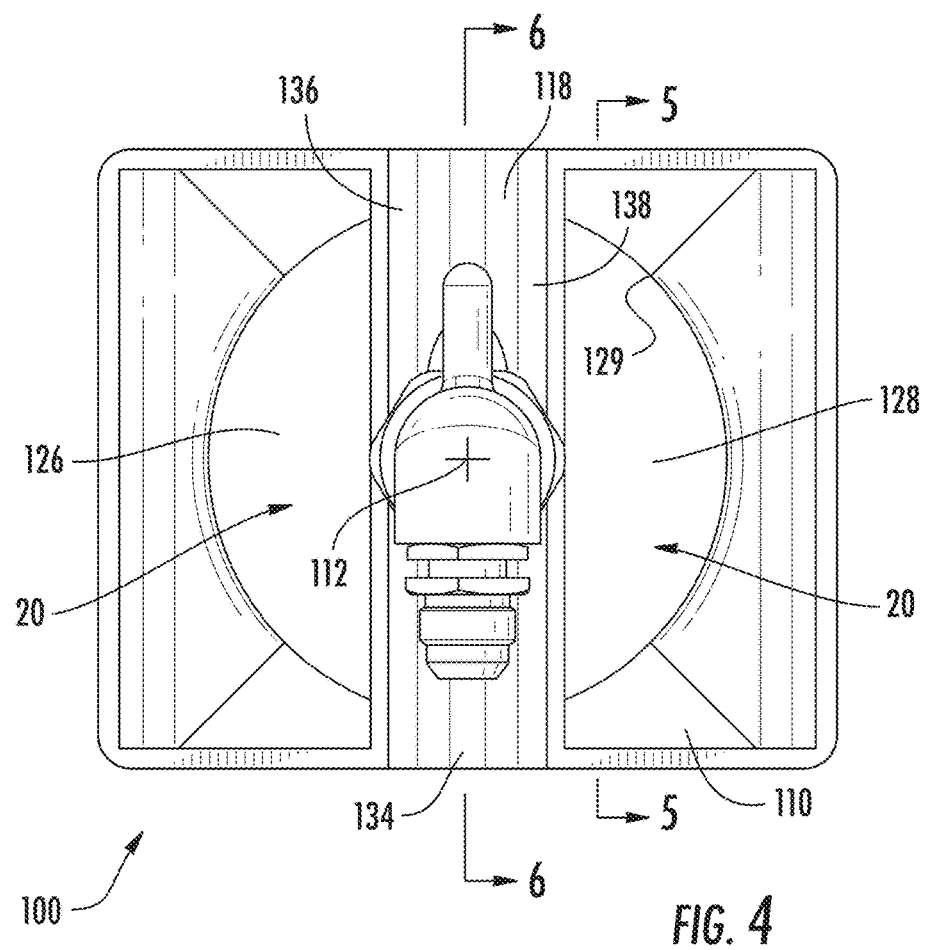
FIG. 4 is an axial end view of the aspirator of FIG. 1, showing the vane spanning the upstream end of the duct and dividing the entrance into the aspirator duct into a first secondary flow inlet and a second secondary flow inlet.

As shown in FIG. 4, the upstream portion 114 of duct 110 is open to the external environment 18 for the ingestion of secondary air. In this respect an entrance 130 (shown in FIG. 3) is defined at the longitudinal extreme upstream end of the duct 110. The vane 118 is seated in the entrance 130 and divides the entrance 130 into a first secondary flow inlet 126 and second secondary flow inlet 128. More particularly, the vane 118 spans the upstream portion 114 of the duct 110 and, in certain embodiments, substantially orthogonal relative to the flow axis 112.

The vane 118 has a u-shaped profile 132 defined by a base segment 134, a first edge segment 136 and a second edge segment 138. The first edge segment 136 extends laterally from the base segment 134, is oriented obliquely toward the flow axis 112, and bounds the first secondary flow inlet 126. The second edge segment 138 extends laterally from the base segment 134 on a side of the flow axis 112 opposite the first edge segment 136, is oriented obliquely toward the flow axis 112, and bounds the second secondary flow inlet 128. It is contemplated that the u-shaped profile 132 of the vane 118 provides strength to the vane 118 (and to the duct 110), allowing the base segment 134 of the vane 118 to support the nozzle 116 (shown in FIG. 5) within the interior of the upstream portion 114 of the duct 110.

As will be appreciated by those of skill in the art in view of the present disclosure, the oblique orientation of the first edge segment 136 and the second edge segment 138 divides the secondary gas flow 20 into two separate flows entering the duct 110 through the first secondary flow inlet 126 and the second secondary flow inlet 128, respectively, each flow having an off-axis component (shown in FIG. 3). This limits the strength of the recirculation zones formed downstream of the vane 118 that develop within the duct 110 as the primary gas for 16 (shown in FIG. 2) accelerates the secondary gas flow 20 through the duct.

Figure 5:
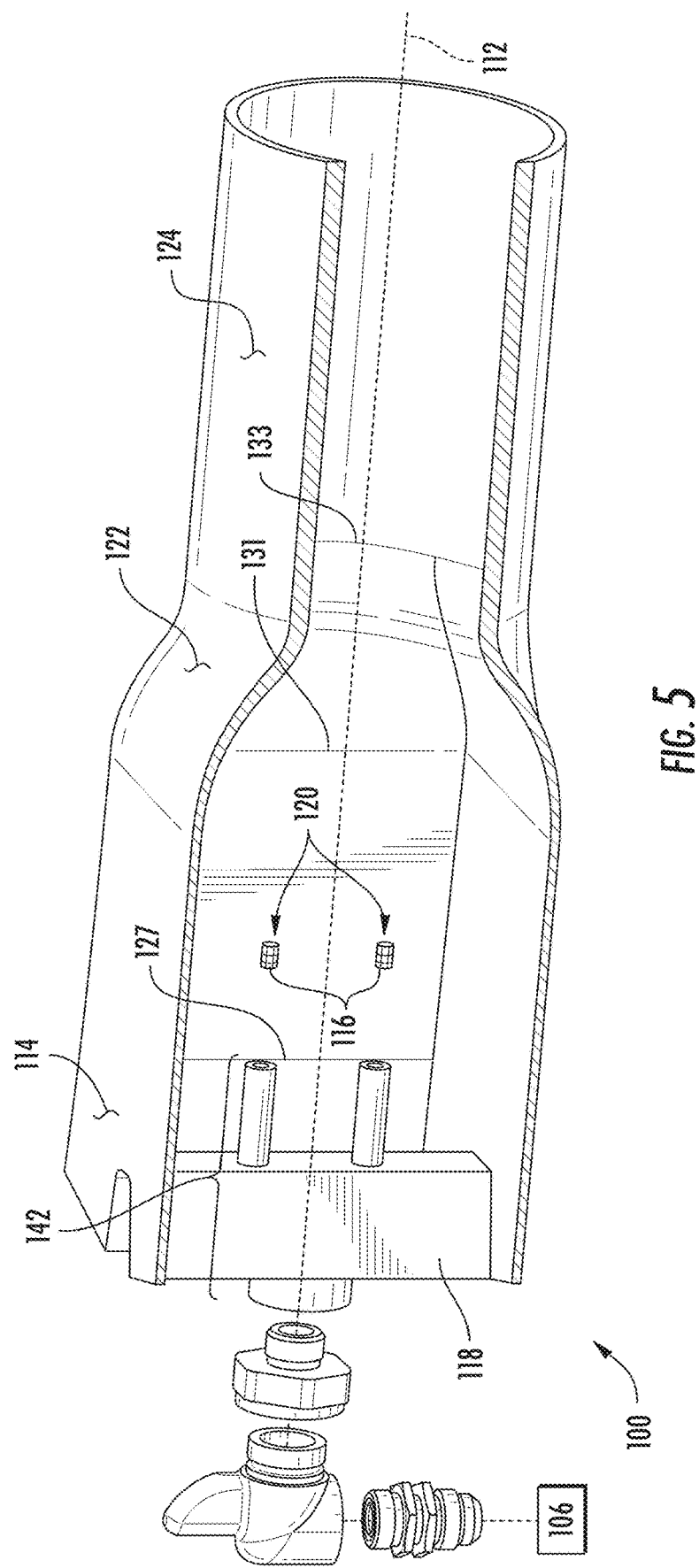
FIG. 5 is a cross-sectional side view of the aspirator of FIG. 1, showing a manifold seated in the vane for introducing a primary gas flow from a compressed gas source into the aspirator duct through two converging-diverging nozzles downstream of the vane.

As shown in FIG. 5, the nozzles 116 are connected to the compressed gas source 106 by a manifold 142. The manifold 142 is supported in along its length by the vane 118, seats the nozzles 116 in a downstream end, and fluidly couples to the compressed gas source 106 on an axially upstream end of the duct 110. In the illustrated embodiment the compressed gas source 106 connects to the manifold through a union 154 defining a 90-degree turn. This allows for packaging the aspirator 100 within the space typically allocated for inflatable evacuation slides on civil aircraft.

In the illustrated embodiment the aspirator has the aspirator has no more than two nozzles 116. Each of the nozzles 116, i.e., a first nozzle and a second nozzle, are located downstream of the vane 118 and are arrange opposite sides of the flow axis 112. Each of the nozzles is a converging-diverging type nozzle. Although two nozzles are shown in the illustrated embodiment it is contemplated that the aspirator 100 can have a single nozzle or more that two nozzles, as suitable for an intended application. Embodiments having no more than two nozzles, as shown and described herein, can limit the pressure loss of the primary gas flow provided through the nozzles to the interior of the duct 110.

As shown in FIG. 6, the manifold 142 (shown in FIG. 5) has a bident shape 140. The bident shape 140 including a first tine portion 144, a second tine portion 146, a first arcuate portion 148, a second arcuate portion 150, and a stem portion 152.

The stem portion 152 is arranged along the flow axis 112 and is seated in the union 154. The first arcuate portion 148 extends axially from the stem portion 152 with a radial component and connects the first tine portion 144 to the stem portion 152. It is contemplated that the first arcuate portion 148 define a relatively broad radius of curvature to limit resistance to primary gas flow 16 as it traverses the first arcuate portion 148 prior to reaching the first tine portion 144. The first nozzle 116 is seated within the first tine portion 144 at an axially downstream location, the first tine portion 144 defining the first of the outlets 120.

The second tine portion 146 is similar to the first tine portion 144 and additionally extends axially from the stem portion 152 to connect the second tine portion 146 to the stem portion 152 on a side of the flow axis 112 opposite the first tine portion 144. It is also contemplated that the second arcuate portion 150 define a relatively broad radius of curvature mirroring that of the first arcuate portion 148 to also limit resistance to primary gas flow 16. The second nozzle 116 is seated within the second tine portion 146 at an axially downstream location of the manifold 142, the second tine portion 146 defining the second of the outlets 120. It is contemplated that one or more of the manifold 142, vane 118 and the duct 110 can be fabricated using an additive manufacturing technique, such as stereo lithography and/or power bed fusion. As will be appreciated by those of skill in the art, such techniques can simplify the assembly of the aspirator and/or limit the time necessary to fabricate the aspirator 100. In accordance with certain embodiments, one or more of the manifold 142, vane 118 and the duct 110 can be fabricated using a subtractive technique. As will also be appreciated by those of skill in the art, use of subtractive techniques can limit the cost associated with fabricating the aspirator 100.

Referring to FIGS. 6 and 7, upon actuation the pressurized gas source 106 provides the primary gas flow 16 to the manifold 142. The primary gas flow 16 flows through the manifold 142 to the nozzles 116, from which the primary gas flow 16 issues from the outlets 120 and enters the duct 110. Once in the duct 110 the primary gas flow 16 induces the secondary gas flow 20, which joins the primary gas flow 16 and which the duct 110 provides to the inflatable body 108 for inflating the inflatable body 102.

Referring to FIGS. 7-9, velocity flow plots are shown for the primary gas flow 16, the secondary gas flow 20, and the inflation gas flow 22. As shown in FIG. 7, the aspirator 100 can provide an average flow velocity at the exit of duct 110 that is efficient when substantially no back pressure is present at the duct exit, such as when the inflatable body 108 (shown in FIG. 2) is uninflated, and when backpressure on the order of about 3 psi (about 20.3 kPa) is present at the duct exit, which allows for inflating the inflatable body 108 within the time allocated for certification purposes with a relatively small compressed gas source 106 (shown in FIG. 2). This is accomplished by the relatively high average output velocity from the aspirator 100 from the duct exit, e.g., on the order of about 0.8 Mach, as shown in FIG. 8, and limiting both size and number of localized recirculation zones 24 within the aspirator, as shown in FIG. 9.

Aspirators nozzle assemblies with large numbers of commonly employ nozzle assemblies in a shower-type arrangement to establish the primary flow in the aspirator. The nozzle assembly typically has a relatively large number of nozzles, e.g., nineteen or more nozzles, which introduce the primary flow at a pressure that is about 15 percent lower than that available at the primary gas source. While generally acceptable for its intended purpose, the pressure drop mandates sets a floor on the size of the primary gas source for a given evacuation assembly inflation requirement.

The methods and systems of the present disclosure, as described above and shown in the drawings, provide for aspirators and evacuation assemblies with superior properties including relatively low resistance to the primary flow gas flowing through the aspirator nozzle. While the apparatus and methods of the subject disclosure have been shown and described with reference to preferred embodiments, those skilled in the art will readily appreciate that changes and/or modifications may be made thereto without departing from the spirit and scope of the subject disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aspirator for an evacuation assembly, comprising:
   a duct defining a flow axis with an upstream portion and a downstream portion;
   a vane spanning the upstream portion of the duct, the vane having a u-shaped profile including a base segment and first and second edge segments, wherein the first edge segment extends laterally from the base segment and towards an inlet of the duct and is oriented obliquely toward the flow axis and the second edge segment extends laterally from the base segment on a side of the flow axis opposite the first edge segment and is oriented obliquely toward the flow axis; and
   a nozzle with an outlet supported by the vane and positioned within the upstream portion of the duct, wherein the outlet of the nozzle is laterally offset from the flow axis.

2. The aspirator as recited in claim 1, wherein the nozzle is a converging-diverging type nozzle.

3. The aspirator as recited in claim 1, wherein the nozzle is a first nozzle and the aspirator further includes a second nozzle, the second nozzle arranged on a side of the flow axis opposite the first nozzle.

4. The aspirator as recited in claim 1, wherein the aspirator has no more than two nozzles.

5. The aspirator as recited in claim 1, further comprising a manifold coupling the nozzle to the vane.

6. The aspirator as recited in claim 3, wherein the manifold has a first tine portion and a second tine portion located on a side of the flow axis axially opposite the first tine portion.

7. The aspirator as recited in claim 6, wherein the manifold has a bident shape with arcuate segments coupling the first and second tine portions to a stem portion, the stem portion seated in the vane.

8. The aspirator as recited in claim 6, wherein the first nozzle is seated within the first tine portion, wherein the second nozzle is seated with the second tine portion.

9. The aspirator as recited in claim 1, further comprising a union for connecting a compressed gas source to the nozzle, wherein the union is arranged upstream of the upstream portion of the duct, and wherein union is arranged along the flow axis defined by the duct.

10. The aspirator as recited in claim 1, further comprising a pressurized gas source connected to the nozzle.

11. The aspirator as recited in claim 1, wherein the upstream portion of the duct has a flow area with a rectangular shape, wherein the downstream portion of the duct has a flow area with a round shape, and wherein the duct further comprises a transition portion coupling the downstream portion to the upstream portion, the transition portion transitioning from a flow area with rectangular shape on an upstream end to a flow area with a round shape on the downstream end of the transition portion.

12. The aspirator as recited in claim 11, wherein the outlet is located upstream of the transition portion of the duct.

13. The aspirator as recited in claim 1, further comprising an inflatable body connected to the downstream portion of the duct and in fluid communication with the upstream portion of the duct.

14. The aspirator as recited in claim 1, further comprising at least one of an aircraft evacuation slide, a life raft, and a pontoon connected to the downstream portion of the duct and in fluid communication through downstream portion of the duct with the upstream portion of the duct.

15. The aspirator as recited in claim 1, wherein the vane divides an entrance into the upstream portion of the duct into a first secondary air inlet and a second secondary air inlet.

16. The aspirator as recited in claim 1, wherein the nozzle is coupled to the base segment of the vane, the edge segments bounding a first secondary gas inlet and second secondary gas inlet into the upstream portion of the duct.

17. The aspirator as recited in claim 1, wherein the upstream portion of the duct has a height of 4.8 inches (12.2 centimeters), wherein the upstream portion of the duct has a width of 5.6 inches (14.2 centimeters), wherein the downstream portion of the duct has a diameter of 4 inches (10.2 centimeters), and wherein the aspirator has an axial length of 17 inches (43.2 centimeters).

18. An evacuation assembly, comprising:

an aspirator as recited in claim 1;

a manifold coupling the nozzle to the vane and having a first tine portion and a second tine portion located on a side of the flow axis axially opposite the first tine portion;

a pressurized gas source connected to the nozzle; and an inflatable body selected from a group includes an aircraft evacuation slide, a life raft, and a pontoon connected to the outlet portion of the duct and in fluid communication through downstream portion with the upstream portion of the duct.

19. The evacuation assembly as recited in claim 18, wherein the vane divides a secondary inlet located on the upstream portion of the duct into a first secondary air inlet and a second secondary air inlet, wherein the vane has a u-shaped profile with a base portion and opposed leg portions, the nozzle connected to the base portion of the vane, the leg portions bounding an inlet of the upstream portion of the duct.

20. The evacuation assembly as recited in claim 18, wherein the nozzle is a converging-diverging nozzle, wherein the nozzle is first nozzle and further comprising a second nozzle, the second nozzle arranged on a side of the flow axis opposite the first nozzle, and wherein the aspirator has no more than two nozzles.

\* \* \* \* \*